United States Patent [19]

Koch

[11] Patent Number: 5,299,601
[45] Date of Patent: Apr. 5, 1994

[54] GAS FLOW DIVERTER

[75] Inventor: William F. Koch, Auburn, Me.

[73] Assignee: Wahlco Engineered Products, Inc., Lewiston, Me.

[21] Appl. No.: 84,892

[22] Filed: Jun. 29, 1993

[51] Int. Cl.$^5$ .............................................. F16K 1/00
[52] U.S. Cl. ................................. 137/875; 60/39.182; 60/694; 165/100
[58] Field of Search ........................... 60/39.182, 694; 165/100, 103; 137/872, 875, 876

[56] References Cited

U.S. PATENT DOCUMENTS 4,821,507  4/1989  Bachmann et al. ............. 60/39.182
5,002,121  3/1991  von Erichsen ..................... 137/875

FOREIGN PATENT DOCUMENTS 901538  7/1962  United Kingdom ................. 137/875

Primary Examiner—Richard A. Bertsch
Assistant Examiner—William Wicker
Attorney, Agent, or Firm—Fish & Richardson

[57] ABSTRACT

An improved gas flow diverter is provided, which includes a rotatably mounted diverter blade, a rotatably mounted turning vane assembly, a drive shaft adapted for receiving torque from a drive mechanism, and a toggle assembly, including a pair of toggle joints, mounted on the drive shaft and linked to the diverter blade and turning vane assembly. The improved construction of the gas flow diverter allows dependent synchronous rotation of the diverter blade and turning vane assembly.

9 Claims, 4 Drawing Sheets

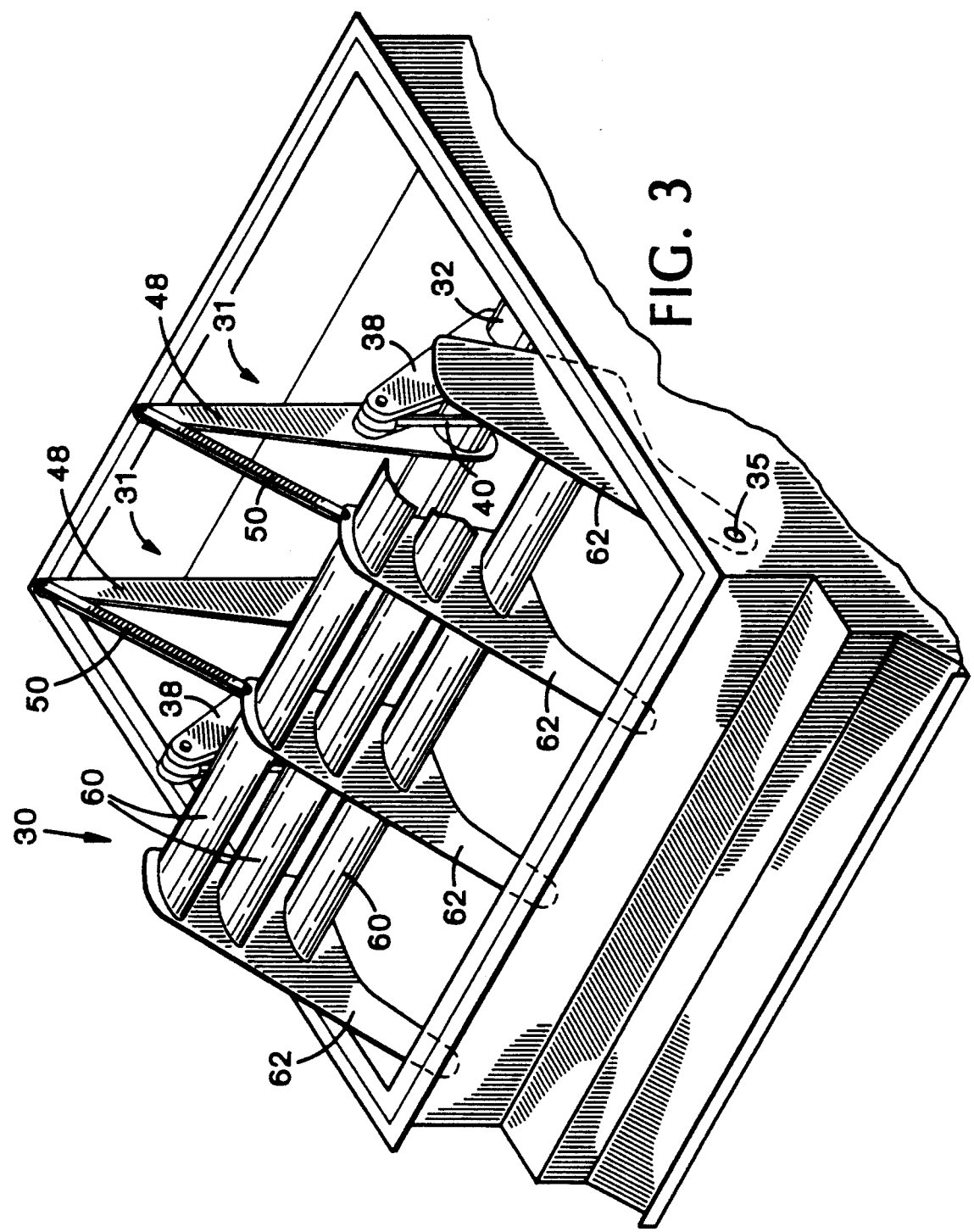

GAS FLOW DIVERTER

BACKGROUND OF THE INVENTION

The present invention relates to gas flow diverters.

Gas flow diverters are employed to direct the flow of hot gases delivered through ductwork. A gas flow diverter is typically positioned at a junction at which two passageways diverge, to direct the flow of gases in the ductwork at the junction. For example, a diverter may be used to direct hot gases flowing from a turbine when the gases reach a junction, at which they could flow through one passageway to a heat recovery steam generator or through the other to an exhaust stack.

Gas flow diverters typically include a housing which has two ports which open onto the two passageways, and which defines a junction space between the two ports. A diverter blade is rotatably mounted in the housing to pivot through the junction space between a first position, in which the blade closes one of the ports, and a second position, in which the blade closes the other port.

Often, when the diverter blade is in one of the two positions, the gas must flow around a sharp corner at the junction, causing turbulent flow which results in a deleterious reduction in pressure head. To smooth the airflow and reduce turbulence, turning vanes have been utilized in some diverter assemblies. These vanes are rotatably mounted at the corner about which the gases flow, and include a drive mechanism to rotate the vanes out of the way of the rotating diverter blade. If the drive mechanism which rotates the turning vanes should fail and the diverter blade should continue to rotate, the diverter blade may strike the turning vanes, causing damage to the diverter.

SUMMARY OF THE INVENTION

The invention features an improved gas flow diverter, which includes a rotatably mounted diverter blade, a rotatably mounted turning vane assembly, a drive shaft, and a toggle assembly mounted on the drive shaft and linked to the diverter blade and turning vane assembly. The toggle assembly is adapted to transmit torque from the drive shaft to synchronously rotate the diverter blade and the turning vane assembly.

The improved diverter utilizes a single drive mechanism to dependently drive both the diverter blade and the turning vane assembly. Accordingly, if the drive mechanism should fail, both the diverter and the turning vanes will be immobilized essentially simultaneously, preventing damage to the diverter.

The toggle assembly also rotates the diverter blade and turning vane assembly in a synchronous manner, i.e., the positions of the diverter blade and turning vane assembly are continuously coordinated so that the diverter blade and turning vane assembly reach the limits of their rotation in each direction at substantially the same time. Because of this synchronous rotation, the diverter blade and turning vane assembly cannot operate out of phase and interfere with one another, as could occur if they were separately driven.

Moreover, replacing the dual drive mechanisms required in conventional diverters with a single drive mechanism results in a significant cost saving, both by reducing the number of moving parts used, thereby decreasing repairs and downtime, and by reducing the power required to operate the diverter.

In one aspect, the invention features a gas flow diverter for directing gas flow through ductwork at a junction between a first passageway and a diverging passageway. The diverter includes a housing, which defines a first port through which gas flows to the first passageway, a second port through which gas flows to the diverging passageway, and a junction space between the first and second ports. A diverter blade is rotatably mounted in the housing to pivot through the junction space. The diverter further includes a turning vane assembly, rotatably mounted in the housing, a drive shaft adapted for receiving torque from a drive mechanism, and a toggle assembly which includes a turning vane toggle joint and a diverter toggle joint. The turning vane toggle joint is fixedly mounted on the drive shaft and pivotally linked to the turning vane assembly, and the diverter toggle joint is fixedly mounted on the drive shaft and pivotally linked to the diverter blade, to transmit torque from the drive shaft to the turning vane assembly and diverter blade, respectively. The diverter blade and turning vane assembly, when rotated by the transmitted torque, move synchronously between a first position, in which the diverter blade closes the second port and the turning vane assembly is positioned within the diverging passageway, and a second position, in which the diverter blade closes the first port and the turning vane assembly is positioned in the junction space.

In preferred embodiments, the diverter blade is mounted on a first pivot shaft at a first corner of the junction, between the first and second ports, and the turning vane assembly is mounted on a second pivot shaft at a second corner of the junction, about which gases will flow when the first passageway is closed by the diverter blade. Typically, the second corner is upstream of the first corner. Preferably, the pivot shafts are substantially parallel to the drive shaft.

The toggle joints each include a toggle lever, a first end of which is fixedly mounted to the drive shaft, and a connecting link, which is pivotally mounted at one end to a second end of the toggle lever and at the other end to the turning vane (in the turning vane toggle joint) or the diverter blade (in the diverter toggle joint). The paired toggle joints are dimensioned, relative to each other, and the drive shaft and pivot shafts positioned, so that the diverter blade and turning vane assembly rotate synchronously. Typically, the turning vane assembly rotates through a larger arc (from about 100 to 150 degrees) than the diverter blade (typically 60 to 90 degrees). Preferably, the diverter includes at least two toggle assemblies.

In other preferred embodiments, seals are provided at the interface between the diverter blade and each port, more preferably leaf spring seals. Preferably, the turning vane assembly includes a plurality of turning vanes.

Other features and advantages of the invention will be apparent from the description of the preferred embodiments thereof, and from the claims.

BRIEF DESCRIPTION OF THE DRAWINGS

FIG. 3 is a partially sectioned perspective view of the gas flow diverter of FIG. 1, in the position shown in FIG. 2a.

DESCRIPTION OF THE PREFERRED EMBODIMENTS

Figure 1:
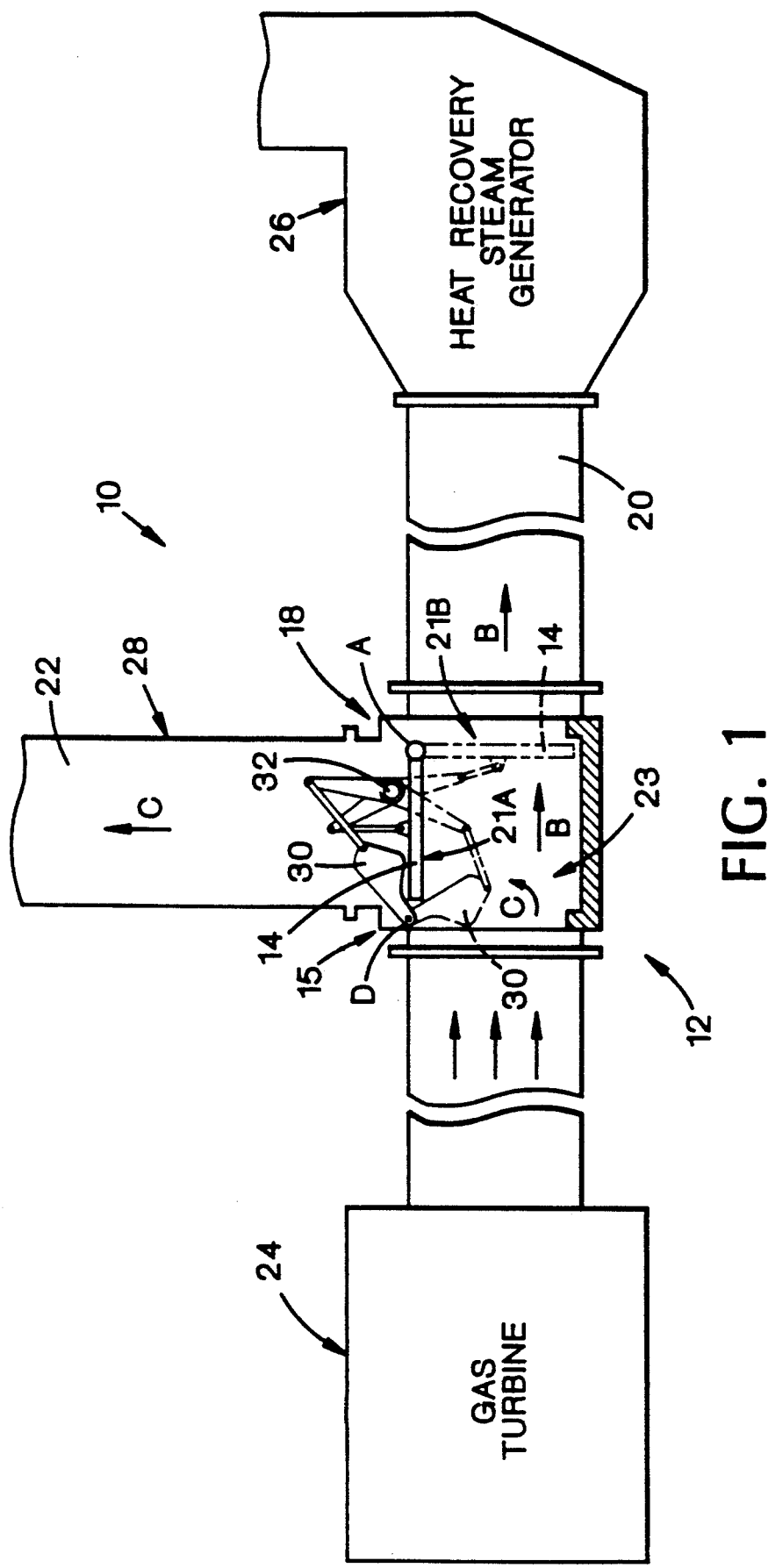
FIG. 1 is a schematic illustration of a typical installation of a gas flow diverter according to one embodiment of the invention.

FIG. 1 schematically illustrates a gas turbine system 10, in which a gas flow diverter 12 is installed. Gas flow diverter 12 includes a diverter blade 14, which is mounted at the junction 18 of passageways 20 and 22. Diverter 12 defines ports 21A and 21B, which open onto passageways 22 and 20, respectively, and junction space 23, between ports 21A and 21B. Passageway 20 delivers a large volume of hot exhaust gas from a gas turbine 24 to a heat recovery steam generator 26. When passageway 20 is closed, the exhaust gas is diverted into passageway 22, which runs to an exhaust stack 28.

Diverter blade 14 is rotatably mounted to pivot about pivot point A, through junction space 23, between a first position, in which it closes port 21A of passageway 22, so that gases flow through passageway 20 (arrows B) and a second position (shown in dotted lines), in which it closes port 21B of passageway 20, allowing gas to be diverted into passageway 22 (arrows C).

Gas flow diverter 12 also includes turning vane assembly 30, positioned at corner 15, the corner around which gases will have to flow when passageway 20 is closed by diverter blade 14. Turning vane assembly 30 is rotatably mounted at pivot point D, to pivot between a first position in which it is in passageway 22 (shown in solid lines) and a second, operative, position in which it is in junction space 23 (shown in dotted lines). The first and second positions of the turning vane assembly correspond to the first and second positions of the diverter blade. Thus, when the diverter blade closes port 21B, allowing gas flow around corner 15, the turning vane assembly is in its operative position, and as the diverter blade swings through the junction space towards port 21A the turning vane assembly rotates out of its way and out of the junction space.

Turning vane assembly 30 may have any desired configuration which will function to smooth the airflow around the corner. Many such configurations are well known in the art. The preferred turning vane assembly, shown most clearly in FIG. 3, comprises three parallel vanes 60, each vane having a similar airfoil shape. The shape of the airfoil can be determined to suit the rate of flow and gas pressure in a given application, as is well known in the art. Vanes 60 are substantially as long as the passageway is wide, so that they extend transversely across the passageway. Vanes 60 are supported by support members 62, which also serve as a point of attachment for connecting links 50 of the turning vane toggle joints, as described below.

As shown schematically in FIG. 1, diverter blade 14 and turning vane assembly 30 are linked by a plurality of toggle assemblies 31 (see FIG. 3, in which two are shown) to drive shaft 32. Drive shaft 32 is rotated by a drive mechanism (not shown), which can be any suitable drive means, e.g., an electric motor. Toggle assembly 31 transmits torque from the rotating drive shaft to rotate the diverter blade and turning vane assembly.

Figure 2:
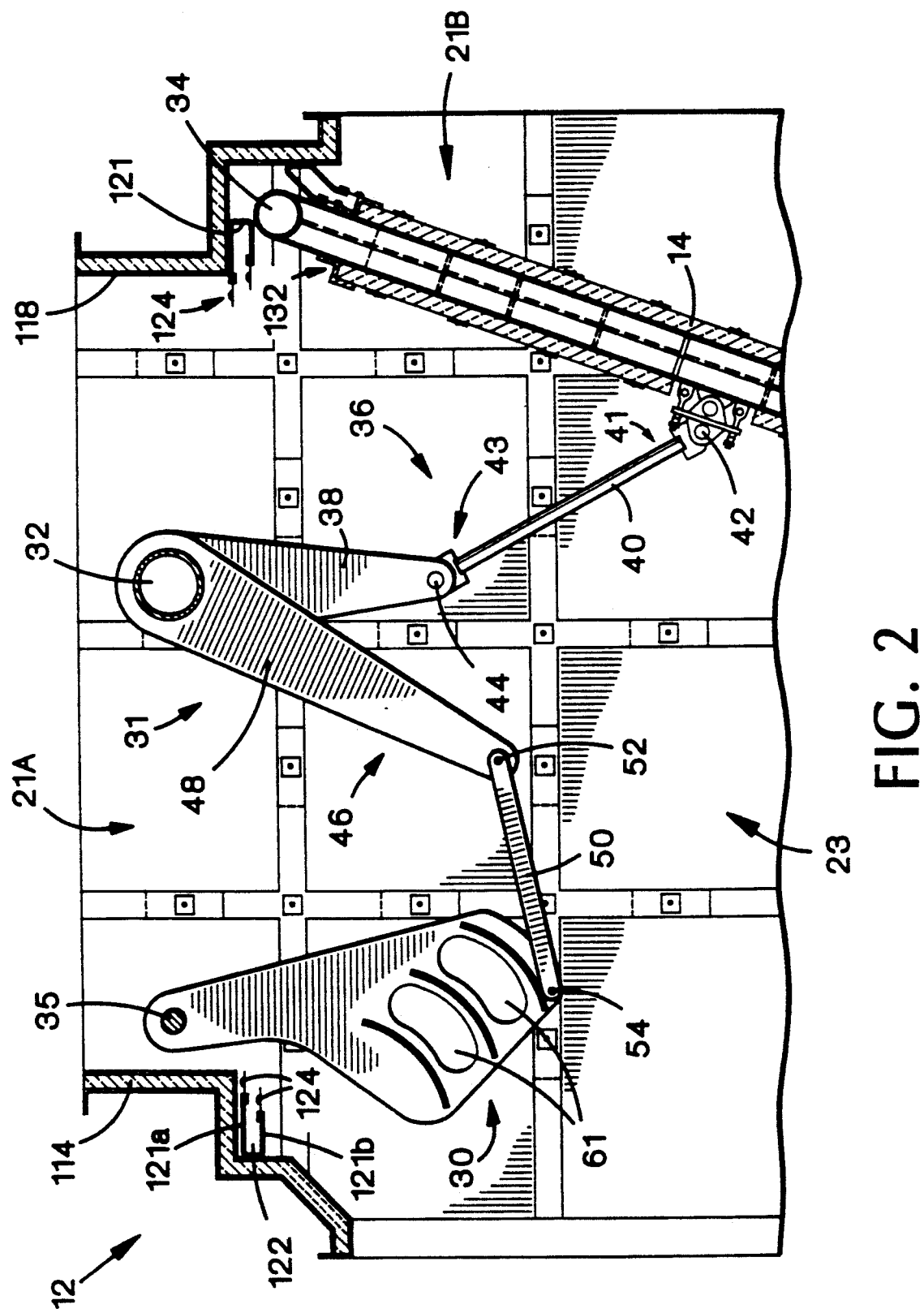
FIGS. 2 and 2a are partial cross-sectional side views of the gas flow diverter of FIG. 1, shown in two positions.
Figure 2A:
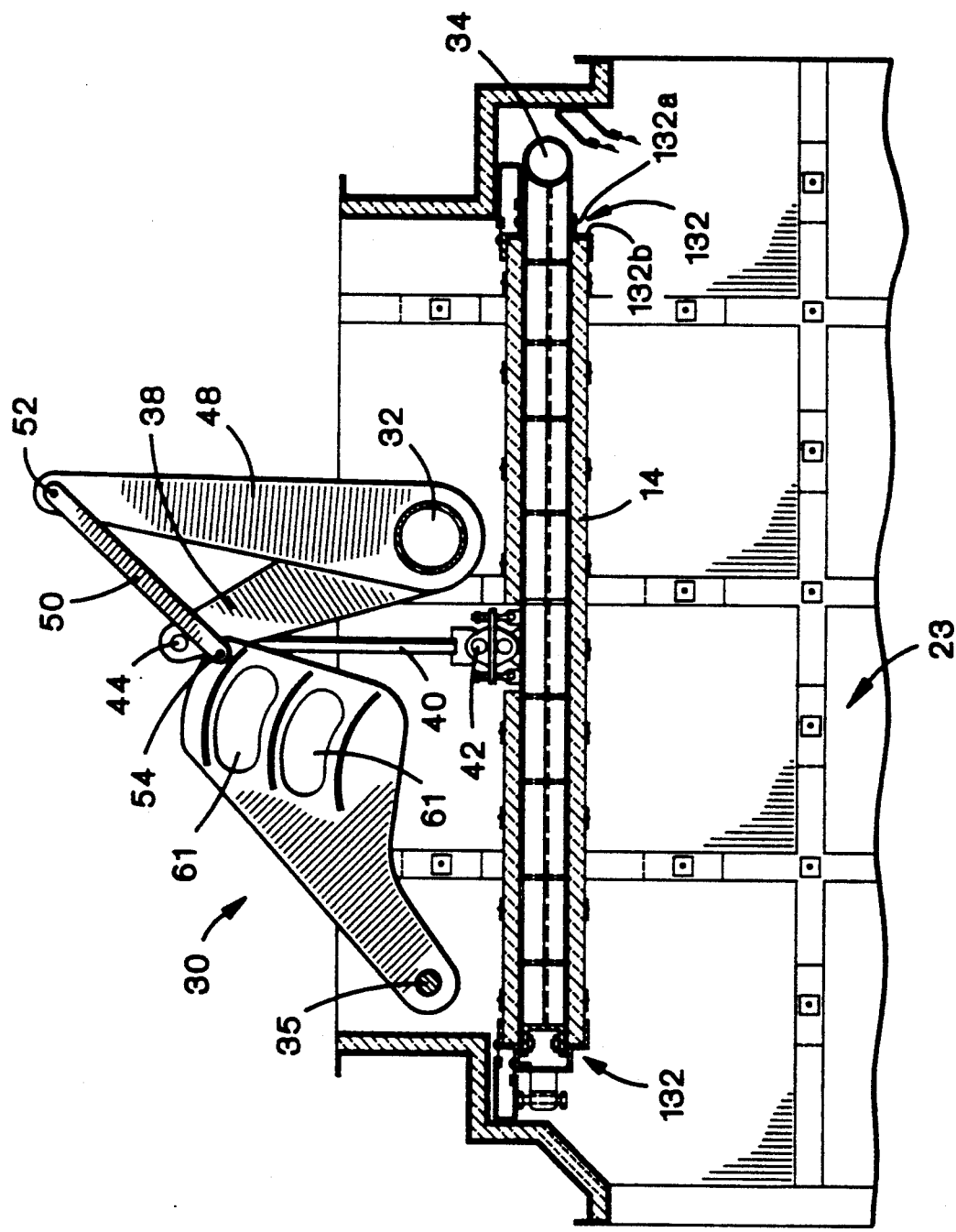

Gas flow diverter 12 is shown in more detail in FIGS. 2 and 2a. Diverter blade 14 is rotatably mounted on transverse pivot shaft 34, and turning vane assembly 30 is rotatably mounted on pivot shaft 35. The ends of pivot shafts 34 and 35 are mounted on the side walls of the diverter, typically by bearings (not shown). Drive shaft 32 extends across port 21A parallel to pivot shafts 34, 35 and supported by bearings mounted on the walls of port 21A (not shown). A drive mechanism (not shown), typically a conventional motor driven rotary actuator, is mounted outside the diverter to rotate drive shaft 32. Preferably, the drive mechanism has adequate power to rotate the diverter blade and turning vane from the first position to the second position in approximately one to three minutes.

Toggle assembly 31 includes paired toggle joints 36 and 46. Diverter toggle joint 36, which comprises diverter toggle lever 38 and diverter connecting link 40, connects diverter blade 14 to drive shaft 32. End 41 of connecting link 40 is pivotally mounted on diverter blade 14, e.g., by clevis pin 42, preferably at approximately the midpoint of the blade. The connecting link is preferably pinned to the blade in a manner to accomodate thermal expansion, e.g., as described in U.S. Pat. No. 4,821,507, the disclosure of which is incorporated herein by reference. End 43 of connecting link 40 is pivotally linked to toggle lever 38, e.g., by pin 44. Toggle lever 38 is fixedly mounted on drive shaft 32, e.g., by welding, enabling toggle lever 38 to transmit torque from the drive shaft to the diverter blade via connecting link 40, causing rotation of the diverter blade about pivot shaft 34.

Similarly, turning vane toggle joint 46 comprises turing vane toggle lever 48, which is fixedly mounted on drive shaft 32, and turning vane connecting link 50 which is rotatably connected at one end to toggle lever 48 (pin 52) and rotatably mounted at the other end on turning vane assembly 30 (pin 54). Thus, toggle lever 48 transmits torque from the drive shaft to the diverter blade via connecting link 50, causing rotation of the turning vane assembly 30 about pivot shaft 35. The toggle levers and connecting links are dimensioned, and the drive and pivot shafts positioned, so that turning vane assembly 30 is synchronously rotated through a larger arc than diverter blade 14 (110 degrees vs. 75 degrees in the illustrated embodiment). Depending upon the configuration of the ports in a particular installation, the turning vane arc may not always be larger than the diverter blade arc. The turning vane arc in most applications will be defined by its two extreme positions, i.e., a first position in which the vane is removed from the travel zone of the diverter blade and a second position in which it is positioned at approximately the midpoint of the corner about which gases flow.

The gas flow diverter 12 is generally square or rectangular in cross-section, as shown, and may be externally reinforced if required by a particular installation, e.g., to withstand pressure loads and structural forces encountered by the diverter.

The gas flow diverter may encounter gases at extremely high temperatures. In some high temperature applications, it is preferred that the interior surfaces of the diverter and its ports be lined with insulation in the form of abutting panels 114 of a material adapted to withstand temperature of 1200° F. or higher. In this embodiment, panels 114 are preferably covered by a stainless steel liner 118, and the pins used for pivotal mounting in the toggle joints are preferably of a high temperature resistant material, to resist distortion.

Diverter ports 21A and 21B are each surrounded by a frame 121 which preferably has an approximately U-shaped cross section, forming a channel 122 defined by two opposing channel walls 121a, 121b. The channels 122 on the four sides of each frame 121 open towards each other in the same plane. Channel wall 121a is wider than channel wall 121b and is seated against panel 114. Both channel walls have seals 124 secured to their outer ends. Seals 124 are preferably leaf spring seals, formed of resilient stainless steel.

To maximize sealing, the diverter blade 14 preferably has a pair of spaced apart, marginal frames generally indicated at 132 which, see FIGS. 2 and 2a, are shaped and dimensioned to provide first and second ledges 132A and 132B, respectively, spaced one from the other in a manner so that each of them seats against the appropriate one of the seals 124 of frame 121 when the blade 14 is positioned to close the port surrounded by that frame. It is typically desirable to supply air to the seals, under adequate pressure to ensure minimal leakage through the seals. Preferred leaf spring seals, and means of delivering air thereto, are described in U.S. Pat. No. 4,821,507.

Other embodiments are within the claims. For example, the frame 121 may be comprised of simple flat bars, and the diverter need not utilize leaf spring seals or sealing air. Many other diverter geometries and dimensions may also be used advantageously with the toggle joint and turning vane assemblies of the invention.

I claim:

1. A gas flow diverter for directing gas flow through ductwork at a junction between a first passageway and a diverging passageway, comprising
    a housing, defining a first port through which gas flows to the first passageway, a second port through which gas flows to the diverging passageway, and a junction space between said first and second ports,
    a diverter blade, rotatably mounted in the housing to pivot through the junction space,
    a turning vane assembly, rotatably mounted in the housing to pivot through the junction space and into said diverging passageway,
    a drive shaft adapted for receiving torque from a drive mechanism, and
    a toggle assembly, comprising a turning vane toggle joint, fixedly mounted on the drive shaft and pivotally linked to the turning vane assembly, and a diverter toggle joint, fixedly mounted on the drive shaft and pivotally linked to the diverter blade, said toggle assembly adapted to transmit torque from the drive shaft to the diverter blade and the turning vane assembly so that the diverter blade and the turning vane assembly are rotated synchronously between a first position, in which the diverter blade closes the second port and the turning vane assembly is positioned in the diverging passageway, and a second position, in which the diverter blade closes the first port and the turning vane assembly is positioned in the junction space.

2. The gas flow diverter of claim 1 wherein the turning vane assembly includes a plurality of turning vanes.

3. The gas flow diverter of claim 1 wherein said diverter toggle joint comprises a diverter toggle lever, having a first end which is fixedly mounted to the drive shaft, and a diverter connecting link, which is pivotally mounted at one end to a second end of the diverter toggle lever and at the other end to the diverter blade, and said turning vane toggle joint comprises a turning vane toggle lever, having a first end which is fixedly mounted to the drive shaft, and a turning vane connecting link, which is pivotally mounted at one end to a second end of the turning vane toggle lever and at the other end to the turning vane assembly.

4. The gas flow diverter of claim 3 wherein said diverter includes at least two toggle assemblies.

5. The gas flow diverter of claim 1 wherein seals are provided at the interface between the periphery of said diverter blade and each port.

6. The gas flow diverter of claim 5 wherein said seals are leaf spring seals.

7. The gas flow diverter of claim 1 wherein the diverter blade is mounted on a first pivot shaft at a first corner of the junction, between the first and second ports, and the turning vane assembly is mounted on a second pivot shaft at a second corner of the junction, about which gases will flow when the first passageway is closed by the diverter blade.

8. The gas flow diverter of claim 7 wherein the second corner is upstream of the first corner.

9. The gas flow diverter of claim 7 wherein the pivot shafts are substantially parallel to the drive shaft.

* * * * *